US012359794B2

(12) United States Patent
Van Bommel et al.

(10) Patent No.: US 12,359,794 B2
(45) Date of Patent: Jul. 15, 2025

(54) HEATSINK COMPRISING A CLOSED-LOGO SLIT FOR PUMPING A CYLINDRICAL PHOSPHOR BODY

(71) Applicant: SIGNIFY HOLDING B.V., Eindhoven (NL)

(72) Inventors: Ties Van Bommel, Horst (NL); Rifat Ata Mustafa Hikmet, Eindhoven (NL); Hugo Johan Cornelissen, Escharen (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/833,529

(22) PCT Filed: Jan. 31, 2023

(86) PCT No.: PCT/EP2023/052245
§ 371 (c)(1),
(2) Date: Jul. 26, 2024

(87) PCT Pub. No.: WO2023/151980
PCT Pub. Date: Aug. 17, 2023

(65) Prior Publication Data
US 2025/0172273 A1 May 29, 2025

(30) Foreign Application Priority Data
Feb. 8, 2022 (EP) .................................... 22155716

(51) Int. Cl.
*F21V 9/30* (2018.01)
*F21V 5/04* (2006.01)
(Continued)

(52) U.S. Cl.
CPC .................. *F21V 9/30* (2018.02); *F21V 5/04* (2013.01); *F21V 7/06* (2013.01); *F21V 29/50* (2015.01)

(58) Field of Classification Search
CPC ..... F21V 9/30; F21V 9/32; F21V 5/04; F21V 7/06; F21V 29/50
See application file for complete search history.

(56) References Cited

U.S. PATENT DOCUMENTS 8,662,672 B2 * 3/2014 Hikmet .................. G03B 21/20 353/31
2014/0362558 A1 12/2014 Nauen
(Continued)

FOREIGN PATENT DOCUMENTS

CN 209638798 U 11/2019
WO 2010116305 A1 10/2010
(Continued)

*Primary Examiner* — Tracie Y Green
*Assistant Examiner* — Michael Chiang

(57) ABSTRACT

The invention provides light generating system (1000) comprising a first light generating device (110), a luminescent body (200), one or more thermally conductive bodies (510), and one or more optical elements (400); wherein: (A) the first light generating device (110) is configured to generate first device light (111), wherein the first light generating device (110) comprises a first light source (10) selected from the group of a superluminescent diode and a laser; (B) the luminescent body (200) comprises a luminescent material (210) configured to convert at least part of the first device light (111) into luminescent material light (211); wherein the luminescent body (200) comprises a first face (201), a second face (202), and a bridging face (203) bridging the first face (201) and the second face (202); wherein the second face (202) has an second face equivalent circular diameter D2, wherein the bridging face (203) In has a first height (H1), wherein H1/D2<1, and a perimeter (P); (C) the one or more thermally conductive bodies (510) comprise:
(Continued)

FIG. 1

(C1) a first thermally conductive body part (511), in thermal contact with at least part of the first face (201); and (C2) a second thermally conductive body part (512), in thermal contact with one or more of (i) part of the bridging face (203) and (ii) part of the second face (202); (D) the first thermally conductive body part (511) and the second thermally conductive body part (512) define a slit-like opening (520) along at least part of the perimeter (P) of the bridging face (203); and (E) the first light generating device (110) and the one or more optical elements (400) are configured to provide the first device light (111) via the slit-like opening (520) to the luminescent body (200).

15 Claims, 3 Drawing Sheets

(51) Int. Cl.
*F21V 7/06* (2006.01)
*F21V 29/50* (2015.01)

(56) References Cited

U.S. PATENT DOCUMENTS

| | | | | |
|---|---|---|---|---|
| 2018/0245744 | A1 | 8/2018 | Li | |
| 2019/0032886 | A1 * | 1/2019 | Daicho | C01F 17/34 |
| 2019/0187544 | A1 | 6/2019 | Liao et al. | |
| 2019/0195484 | A1 * | 6/2019 | Yamana | F21V 9/30 |
| 2022/0290842 | A1 * | 9/2022 | Vdovin | F21V 29/503 |
| 2023/0393321 | A1 * | 12/2023 | Niino | G02B 6/4214 |

FOREIGN PATENT DOCUMENTS

| | | | |
|---|---|---|---|
| WO | 2018127391 | A1 | 7/2018 |
| WO | 2019166273 | A1 | 9/2019 |
| WO | 2020016058 | A1 | 1/2020 |
| WO | 2021028426 | A1 | 2/2021 |
| WO | 2021032690 | A1 | 2/2021 |
| WO | 2021160573 | A1 | 8/2021 |

* cited by examiner

HEATSINK COMPRISING A CLOSED-LOGO SLIT FOR PUMPING A CYLINDRICAL PHOSPHOR BODY

CROSS-REFERENCE TO PRIOR APPLICATIONS

This application is the U.S. National Phase application under 35 U.S.C. § 371 of International Application No. PCT/EP2023/052245, filed on Jan. 31, 2023, which claims the benefit of European Patent Application No. 22155716.8, filed on Feb. 8, 2022. These applications are hereby incorporated by reference herein.

FIELD OF THE INVENTION

The invention relates to a light generating system and to a lighting device comprising such light generating system.

BACKGROUND OF THE INVENTION

Illumination systems are known in the art. US2019/187544, for instance, describes an illumination system, comprising: a first light-emitting module, configured to emit at least one first color light, wherein the at least one first color light comprises a first partial light and a second partial light; a wavelength conversion unit, disposed on a transmission path of the first partial light, wherein the first partial light is converged to the wavelength conversion unit, the second partial light passes by a location beside the wavelength conversion unit, and the wavelength conversion unit converts the first partial light into a converted light, wherein a wavelength of the converted light is greater than a wavelength of the at least one first color light; a spherical-shell-shaped dichroic film, disposed on a transmission path of the at least one first color light between the first light-emitting module and the wavelength conversion unit, the spherical-shell-shaped dichroic film being pervious to the at least one first color light, and being capable of reflecting the converted light, wherein the converted light coming from the wavelength conversion unit is reflected by the spherical-shell-shaped dichroic film, and then at least partially coincides with the second partial light; and a transparent substrate, carrying the spherical-shell-shaped dichroic film.

WO2010116305A discloses a lamp adapted for generating high power in laser applications. The lamp comprises a source adapted for emitting optical radiation along an optical path and a holder comprising a fluorescent body, wherein the holder is arranged in the optical path. A collecting unit is provided which is adapted for transmitting at least a portion of optical radiation emitted by the fluorescent body to an output of the lamp, and the fluorescent body comprises a shape being elongated in a predetermined direction.

SUMMARY OF THE INVENTION

While white LED sources can give an intensity of e.g. up to about 300 $lm/mm^2$; static phosphor converted laser white sources can give an intensity even up to about 20.000 $lm/mm^2$. Ce doped garnets (e.g. YAG, LuAG) may be the most suitable luminescent convertors which can be used for pumping with blue laser light as the garnet matrix has a very high chemical stability. Further, at low Ce concentrations (e.g. below 0.5%) temperature quenching may only occur above about 200° C. Furthermore, emission from Ce has a very fast decay time so that optical saturation can essentially be avoided. Assuming e.g. a reflective mode operation, blue laser light may be incident on a phosphor. This may in embodiments realize almost full conversion of blue light, leading to emission of converted light. It is for this reason that the use of garnet phosphors with relatively high stability and thermal conductivity is suggested. However, also other phosphors may be applied. Heat management may remain an issue when extremely high-power densities are used.

High brightness light sources can be used in applications such as projection, stage-lighting, spot-lighting and automotive lighting. For this purpose, laser-phosphor technology can be used wherein a laser provides laser light and e.g. a (remote) phosphor converts laser light into converted light. The phosphor may in embodiments be arranged on or inserted in a heatsink for improved thermal management and thus higher brightness.

There appears to be a desire for relatively high intensity lighting systems which may preferably be relatively compact and/or relatively simple, and which may preferably reliable, such as a spectrally stable light, independent of the intensity. However, some luminescent materials show a temperature dependent intensity, which may lead to problems when pumping at relatively high intensity.

Hence, it is an aspect of the invention to provide an alternative light generating device, which preferably further at least partly obviates one or more of above-described drawbacks. The present invention may have as object to overcome or ameliorate at least one of the disadvantages of the prior art, or to provide a useful alternative.

Hence, in a first aspect the invention provides a light generating system ("system") comprising a first light generating device, a luminescent body, one or more thermally conductive bodies, and one or more optical elements. The first light generating device is configured to generate first device light. The first light generating device comprises a first light source selected from the group of a superluminescent diode and a laser. The luminescent body comprises a luminescent material configured to convert at least part of the first device light into luminescent material light. The luminescent body comprises a first face, a second face, and a bridging face bridging the first face and the second face. The second face has a second face equivalent circular diameter D2. In embodiments, the bridging face has a first height (H1), wherein $H1/D2<1$. The bridging face has a perimeter (P). The one or more thermally conductive bodies being reflective for the first device light and the luminescent material light and comprise (i) a first thermally conductive body part, in thermal contact with at least part of the first face, and (ii) a second thermally conductive body part, in thermal contact with part of the bridging face and part of the second face. The first thermally conductive body part and the second thermally conductive body part define a slit-like opening along at least part of the perimeter (P) of the bridging face. The first light generating device and the one or more optical elements are configured to provide the first device light via the slit-like opening to the luminescent body. During operation of the light generating system, at least part of the luminescent material light escapes from at least part of said second face. Therefore, in specific embodiments the invention provides a light generating system comprising a first light generating device, a luminescent body, one or more thermally conductive bodies, and one or more optical elements; wherein: (A) the first light generating device is configured to generate first device light, wherein the first light generating device comprises a first light source selected from the group of a superluminescent diode and a laser; (B) the luminescent body comprises a luminescent material configured to convert at least part of the first device light into luminescent material light; wherein the luminescent body comprises a first face, a second face, and a bridging face bridging the first face and the second face; wherein the second face has an second face equivalent circular diameter D2, wherein the bridging face has a first height (H1), wherein H1/D2<1, and a perimeter (P); (C) the one or more thermally conductive bodies comprise: (C1) a first thermally conductive body part, in thermal contact with at least part of the first face; and (C2) a second thermally conductive body part, in thermal contact with one or more of (i) part of the bridging face and (ii) part of the second face; (D) the first thermally conductive body part and the second thermally conductive body part define a slit-like opening along at least part of the perimeter (P) of the bridging face; and (E) the first light generating device and the one or more optical elements are configured to provide the first device light via the slit-like opening to the luminescent body.

With such system it may be possible to provide high intensity system light. Yet, with such system it may be possible to provide relatively efficiently high intensity system light. Further, with such system the reliability may be higher. Hence, over time the output may be spectrally more stable. Further, in embodiments it may be possible to control the system light, and thereby control one or more of color point, color rendering index, and correlated color temperature. Further, such system may be based on relatively simple components. Further, with such system it may be possible to provide system light having a good or even high CRI.

As indicated above, the light generating system may comprise a first light generating device, a luminescent body, one or more thermally conductive bodies, and one or more optical elements.

The first light generating device may especially be configured to generate first device light. Especially, the first light generating device may comprise a first light source. The first light source may especially be configured to generate first light source light. In embodiments, the first device light may essentially consist of the first light source light. In specific embodiments, the first light source may comprise a first laser device, such as a diode laser. Hence, in specific embodiments the first light source light may comprise first laser device light. Therefore, in specific embodiments the first device light may essentially consist of first laser device light. Hence, as also indicated below, in embodiment the light generating system may comprise a first laser device. The term "first laser device" may also refer to a plurality of essentially the same type of first laser devices, like from the same bin. Alternatively or additionally, in specific embodiments the first light source may comprise a first superluminescent diode. Hence, in specific embodiments the first light source light may comprise first superluminescent diode light. Therefore, in specific embodiments the first device light may essentially consist of first superluminescent diode light. Hence, as also indicated below, in embodiment the light generating system may comprise a first superluminescent diode. The term "first superluminescent diode" may also refer to a plurality of essentially the same type of first superluminescent diodes, like from the same bin.

The term "light source" may in principle relate to any light source known in the art. It may be a conventional (tungsten) light bulb, a low pressure mercury lamp, a high pressure mercury lamp, a fluorescent lamp, a LED (light emissive diode). In a specific embodiment, the light source comprises a solid state LED light source (such as a LED or laser diode (or "diode laser")). The term "light source" may also relate to a plurality of light sources, such as 2-200 (solid state) LED light sources. Hence, the term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of light emitting semiconductor light source may be configured on the same substrate. In embodiments, a COB is a multi LED chip configured together as a single lighting module.

The light source may have a light escape surface. Referring to conventional light sources such as light bulbs or fluorescent lamps, it may be outer surface of the glass or quartz envelope. For LED's it may for instance be the LED die, or when a resin is applied to the LED die, the outer surface of the resin. In principle, it may also be the terminal end of a fiber. The term escape surface especially relates to that part of the light source, where the light actually leaves or escapes from the light source. The light source is configured to provide a beam of light. This beam of light (thus) escapes from the light exit surface of the light source.

Likewise, a light generating device may comprise a light escape surface, such as an end window. Further, likewise a light generating system may comprise a light escape surface, such as an end window.

The term "light source" may refer to a semiconductor light-emitting device, such as a light emitting diode (LEDs), a resonant cavity light emitting diode (RCLED), a vertical cavity laser diode (VCSELs), an edge emitting laser, etc. The term "light source" may also refer to an organic light-emitting diode (OLED), such as a passive-matrix (PMOLED) or an active-matrix (AMOLED). In a specific embodiment, the light source comprises a solid-state light source (such as a LED or laser diode). In an embodiment, the light source comprises a LED (light emitting diode). The terms "light source" or "solid state light source" may also refer to a superluminescent diode (SLED).

The term LED may also refer to a plurality of LEDs.

The term "light source" may also relate to a plurality of (essentially identical (or different)) light sources, such as 2-2000 solid state light sources. In embodiments, the light source may comprise one or more micro-optical elements (array of micro lenses) downstream of a single solid-state light source, such as a LED, or downstream of a plurality of solid-state light sources (i.e. e.g. shared by multiple LEDs). In embodiments, the light source may comprise a LED with on-chip optics. In embodiments, the light source comprises a pixelated single LEDs (with or without optics) (offering in embodiments on-chip beam steering).

In embodiments, the light source may be configured to provide primary radiation, which is used as such, such as e.g. a blue light source, like a blue LED, or a green light source, such as a green LED, and a red light source, such as a red LED. Such LEDs, which may not comprise a luminescent material ("phosphor") may be indicated as direct color LEDs.

In other embodiments, however, the light source may be configured to provide primary radiation and part of the primary radiation is converted into secondary radiation. Secondary radiation may be based on conversion by a luminescent material. The secondary radiation may therefore also be indicated as luminescent material radiation. The luminescent material may in embodiments be comprised by the light source, such as a LED with a luminescent material layer or dome comprising luminescent material. Such LEDs may be indicated as phosphor converted LEDs or PC LEDs (phosphor converted LEDs). In other embodiments, the luminescent material may be configured at some distance ("remote") from the light source, such as a LED with a luminescent material layer not in physical contact with a die of the LED.

In embodiments, the light generating device may comprise a luminescent material. In embodiments, the light generating device may comprise a PC LED. In other embodiments, the light generating device may comprise a direct LED (i.e. no phosphor). In embodiments, the light generating device may comprise a laser device, like a laser diode. In embodiments, the light generating device may comprise a superluminescent diode. Hence, in specific embodiments, the light source may be selected from the group of laser diodes and superluminescent diodes. In other embodiments, the light source may comprise an LED.

The light source may especially be configured to generate light source light having an optical axis (O), (a beam shape,) and a spectral power distribution. The light source light may in embodiments comprise one or more bands, having band widths as known for lasers.

The term "light source" may (thus) refer to a light generating element as such, like e.g. a solid state light source, or e.g. to a package of the light generating element, such as a solid state light source, and one or more of a luminescent material comprising element and (other) optics, like a lens, a collimator. A light converter element ("converter element" or "converter") may comprise a luminescent material comprising element. For instance, a solid state light source as such, like a blue LED, is a light source. A combination of a solid state light source (as light generating element) and a light converter element, such as a blue LED and a light converter element, optically coupled to the solid state light source, may also be a light source (but may also be indicated as light generating device). Hence, a white LED is a light source (but may e.g. also be indicated as (white) light generating device). The term "light source" herein may also refer to a light source comprising a solid state light source, such as an LED or a laser diode or a superluminescent diode.

The "term light source" may (thus) in embodiments also refer to a light source that is (also) based on conversion of light, such as a light source in combination with a luminescent converter material. Hence, the term "light source" may also refer to a combination of a LED with a luminescent material configured to convert at least part of the LED radiation, or to a combination of a (diode) laser with a luminescent material configured to convert at least part of the (diode) laser radiation.

In embodiments, the term "light source" may also refer to a combination of a light source, like a LED, and an optical filter, which may change the spectral power distribution of the light generated by the light source. Especially, the "term light generating device" may be used to address a light source and further (optical components), like an optical filter and/or a beam shaping element, etc.

The phrases "different light sources" or "a plurality of different light sources", and similar phrases, may in embodiments refer to a plurality of solid-state light sources selected from at least two different bins. Likewise, the phrases "identical light sources" or "a plurality of same light sources", and similar phrases, may in embodiments refer to a plurality of solid-state light sources selected from the same bin.

The term "solid state light source", or "solid state material light source", and similar terms, may especially refer to semiconductor light sources, such as a light emitting diode (LED), a diode laser, or a superluminescent diode.

The term "laser light source" especially refers to a laser. Such laser may especially be configured to generate laser light source light having one or more wavelengths in the UV, visible, or infrared, especially having a wavelength selected from the spectral wavelength range of 200-2000 nm, such as 300-1500 nm. The term "laser" especially refers to a device that emits light through a process of optical amplification based on the stimulated emission of electromagnetic radiation.

Especially, in embodiments the term "laser" may refer to a solid-state laser. In specific embodiments, the terms "laser" or "laser light source", or similar terms, refer to a laser diode (or diode laser). However, other embodiments may also be possible.

Hence, in embodiments the light source comprises a laser light source. In embodiments, the terms "laser" or "solid state laser" or "solid state material laser" may refer to one or more of cerium doped lithium strontium (or calcium) aluminum fluoride (Ce:LiSAF, Ce:LiCAF), chromium doped chrysoberyl (alexandrite) laser, chromium ZnSe (Cr:ZnSe) laser, divalent samarium doped calcium fluoride ($Sm:CaF_2$) laser, Er:YAG laser, erbium doped and erbium-ytterbium codoped glass lasers, F-Center laser, holmium YAG (Ho:YAG) laser, Nd:YAG laser, NdCrYAG laser, neodymium doped yttrium calcium oxoborate $Nd:YCa_4O(BO_3)_3$ or Nd:YCOB, neodymium doped yttrium orthovanadate ($Nd:YVO_4$) laser, neodymium glass (Nd:glass) laser, neodymium YLF (Nd:YLF) solid-state laser, promethium 147 doped phosphate glass ($147Pm^{3+}$:glass) solid-state laser, ruby laser ($Al_2O_3:Cr^{3+}$), thulium YAG (Tm:YAG) laser, titanium sapphire (Ti:sapphire; $Al_2O_3:Ti^{3+}$) laser, trivalent uranium doped calcium fluoride ($U:CaF_2$) solid-state laser, Ytterbium doped glass laser (rod, plate/chip, and fiber), Ytterbium YAG (Yb:YAG) laser, $Yb_2O_3$(glass or ceramics) laser, etc.

For instance, including second and third harmonic generation embodiments, the light source may comprise one or more of an F center laser, an yttrium orthovanadate ($Nd:YVO_4$) laser, a promethium 147 doped phosphate glass ($147Pm^{3+}$:glass), and a titanium sapphire (Ti:sapphire; $Al_2O_3:Ti^{3+}$) laser. For instance, considering second and third harmonic generation, such light sources may be used to generated blue light.

In embodiments, the terms "laser" or "solid state laser" or "solid state material laser" may refer to one or more of a semiconductor laser diodes, such as GaN, InGaN, AlGaInP, AlGaAs, InGaAsP, lead salt, vertical cavity surface emitting laser (VCSEL), quantum cascade laser, hybrid silicon laser, etc.

A laser may be combined with an upconverter in order to arrive at shorter (laser) wavelengths. For instance, with some (trivalent) rare earth ions upconversion may be obtained or with non-linear crystals upconversion can be obtained. Alternatively, a laser can be combined with a downconverter, such as a dye laser, to arrive at longer (laser) wavelengths.

As can be derived from the below, the term "laser light source" may also refer to a plurality of (different or identical) laser light sources. In specific embodiments, the term "laser light source" may refer to a plurality N of (identical) laser light sources. In embodiments, N=2, or more. In specific embodiments, N may be at least 5, such as especially at least 8. In this way, a higher brightness may be obtained. In embodiments, laser light sources may be arranged in a laser bank (see also above). The laser bank may in embodiments comprise heat sinking and/or optics e.g. a lens to collimate the laser light. Hence, in embodiments lasers in a laser bank may share the same optics.

The laser light source is configured to generate laser light source light (or "laser light"). The light source light may essentially consist of the laser light source light. The light source light may also comprise laser light source light of two or more (different or identical) laser light sources. For instance, the laser light source light of two or more (different or identical) laser light sources may be coupled into a light guide, to provide a single beam of light comprising the laser light source light of the two or more (different or identical) laser light sources. In specific embodiments, the light source light is thus especially collimated light source light. In yet further embodiments, the light source light is especially (collimated) laser light source light.

The laser light source light may in embodiments comprise one or more bands, having band widths as known for lasers. In specific embodiments, the band(s) may be relatively sharp line(s), such as having full width half maximum (FWHM) in the range of less than 20 nm at RT, such as equal to or less than 10 nm. Hence, the light source light has a spectral power distribution (intensity on an energy scale as function of the wavelength) which may comprise one or more (narrow) bands.

The beams (of light source light) may be focused or collimated beams of (laser) light source light. The term "focused" may especially refer to converging to a small spot. This small spot may be at the discrete converter region, or (slightly) upstream thereof or (slightly) downstream thereof. Especially, focusing and/or collimation may be such that the cross-sectional shape (perpendicular to the optical axis) of the beam at the discrete converter region (at the side face) is essentially not larger than the cross-section shape (perpendicular to the optical axis) of the discrete converter region (where the light source light irradiates the discrete converter region). Focusing may be executed with one or more optics, like (focusing) lenses. Especially, two lenses may be applied to focus the laser light source light. Collimation may be executed with one or more (other) optics, like collimation elements, such as lenses and/or parabolic mirrors. In embodiments, the beam of (laser) light source light may be relatively highly collimated, such as in embodiments ≤2° (FWHM), more especially ≤1° (FWHM), most especially ≤0.5°(FWHM). Hence, ≤2° (FWHM) may be considered (highly) collimated light source light. Optics may be used to provide (high) collimation (see also above).

The term "solid state material laser", and similar terms, may refer to a solid state laser like based on a crystalline or glass body dopes with ions, like transition metal ions and/or lanthanide ions, to a fiber laser, to a photonic crystal laser, to a semiconductor laser, such as e.g. a vertical cavity surface-emitting laser (VCSEL), etc. The term "solid state light source", and similar terms, may especially refer to semiconductor light sources, such as a light emitting diode (LED), a diode laser, or a superluminescent diode. The term "laser light source" may e.g. refer to a diode laser or a solid state laser, etc.

Superluminescent diodes are known in the art. A superluminescent diode may be indicated as a semiconductor device which may be able to emit low-coherence light of a broad spectrum like a LED, while having a brightness in the order of a laser diode.

US2020192017 indicates for instance that "With current technology, a single SLED is capable of emitting over a bandwidth of for example, at most 50-70 nm in the 800-900 nm wavelength range with sufficient spectral flatness and sufficient output power. In the visible range used for display applications, i.e. in the 450-650 nm wavelength range, a single SLED is capable of emitting over bandwidth of at most 10-30 nm with current technology. Those emission bandwidths are too small for a display or projector application which requires red (640 nm), green (520 nm) and blue (450 nm), i.e. RGB, emission". Further, superluminescent diodes are amongst others described, in "Edge Emitting Laser Diodes and Superluminescent Diodes", Szymon Stanczyk, Anna Kafar, Dario Schiavon, Stephen Najda, Thomas Slight, Piotr Perlin, Book Editor(s): Fabrizio Roccaforte, Mike Leszczynski, First published: 3 Aug. 2020 https://doi.org/10.1002/9783527825264.ch9 in chapter 9.3 superluminescent diodes. This book, and especially chapter 9.3, are herein incorporated by reference. Amongst others, it is indicated therein that the superluminescent diode (SLD) is an emitter, which combines the features of laser diodes and light-emitting diodes. SLD emitters utilize the stimulated emission, which means that these devices operate at current densities similar to those of laser diodes. The main difference between LDs and SLDs is that in the latter case, the device waveguide may be designed in a special way preventing the formation of a standing wave and lasing. Still, the presence of the waveguide ensures the emission of a high-quality light beam with high spatial coherence of the light, but the light is characterized by low time coherence at the same time" and "Currently, the most successful designs of nitride SLD are bent, curved, or tilted waveguide geometries as well as tilted facet geometries, whereas in all cases, the front end of the waveguide meets the device facet in an inclined way, as shown in FIG. 9.10. The inclined waveguide suppresses the reflection of light from the facet to the waveguide by directing it outside to the lossy unpumped area of the device chip". Hence, an SLD may especially be a semiconductor light source, where the spontaneous emission light is amplified by stimulated emission in the active region of the device. Such emission is called "super luminescence". Superluminescent diodes combine the high power and brightness of laser diodes with the low coherence of conventional light-emitting diodes. The low (temporal) coherence of the source has advantages that the speckle is significantly reduced or not visible, and the spectral distribution of emission is much broader compared to laser diodes, which can be better suited for lighting applications. Especially, with varying electrical current, the spectral power distribution of the superluminescent diode may vary. In this way the spectral power distribution can be controlled, see e.g. also Abdullah A. Alatawi, et al., Optics Express Vol. 26, Issue 20, pp. 26355-26364, https://doi.org/10.1364/OE.26.026355.

Therefore, in embodiments the first light generating device may be configured to generate first device light, wherein the first light generating device comprises a first light source selected from the group of a superluminescent diode and a laser.

At least part of the first device light may be used to pump the luminescent material (see further also below).

The system may further comprise a luminescent body. Especially, the luminescent body comprises a luminescent material configured to convert at least part of the first device light into luminescent material light.

Here below, some embodiments in relation to luminescent materials in general are described.

The term "luminescent material" especially refers to a material that can convert first radiation, especially one or more of UV radiation and blue radiation, into second radiation. In general, the first radiation and second radiation have different spectral power distributions. Hence, instead of the term "luminescent material", also the terms "luminescent converter" or "converter" may be applied. In general, the second radiation has a spectral power distribution at larger wavelengths than the first radiation, which is the case in the so-called down-conversion. In specific embodiments, however the second radiation has a spectral power distribution with intensity at smaller wavelengths than the first radiation, which is the case in the so-called up-conversion.

In embodiments, the "luminescent material" may especially refer to a material that can convert radiation into e.g. visible and/or infrared light. For instance, in embodiments the luminescent material may be able to convert one or more of UV radiation and blue radiation, into visible light. The luminescent material may in specific embodiments also convert radiation into infrared radiation (IR). Hence, upon excitation with radiation, the luminescent material emits radiation. In general, the luminescent material will be a down converter, i.e. radiation of a smaller wavelength is converted into radiation with a larger wavelength ($\lambda_{ex}<\lambda_{em}$) though in specific embodiments the luminescent material may comprise up-converter luminescent material, i.e. radiation of a larger wavelength is converted into radiation with a smaller wavelength ($\lambda_{ex}>\lambda_{em}$).

In embodiments, the term "luminescence" may refer to phosphorescence. In embodiments, the term "luminescence" may also refer to fluorescence. Instead of the term "luminescence", also the term "emission" may be applied. Hence, the terms "first radiation" and "second radiation" may refer to excitation radiation and emission (radiation), respectively. Likewise, the term "luminescent material" may in embodiments refer to phosphorescence and/or fluorescence.

The term "luminescent material" may also refer to a plurality of different luminescent materials. Examples of possible luminescent materials are indicated below. Hence, the term "luminescent material" may in specific embodiments also refer to a luminescent material composition.

In embodiments, luminescent materials are selected from garnets and nitrides, especially doped with trivalent cerium or divalent europium, respectively. The term "nitride" may also refer to oxynitride or nitridosilicate, etc. Alternatively or additionally, the luminescent material(s) may be selected from silicates, especially doped with divalent europium.

In specific embodiments the luminescent material comprises a luminescent material of the type $A_3BO_{12}$:Ce, wherein A in embodiments comprises one or more of Y, La, Gd, Tb and Lu, especially (at least) one or more of Y, Gd, Tb and Lu, and wherein B in embodiments comprises one or more of Al, Ga, In and Sc. Especially, A may comprise one or more of Y, Gd and Lu, such as especially one or more of Y and Lu. Especially, B may comprise one or more of Al and Ga, more especially at least Al, such as essentially entirely Al. Hence, especially suitable luminescent materials are cerium comprising garnet materials. Embodiments of garnets especially include $A_3B_5O_{12}$ garnets, wherein A comprises at least yttrium or lutetium and wherein B comprises at least aluminum. Such garnets may be doped with cerium (Ce), with praseodymium (Pr) or a combination of cerium and praseodymium; especially however with Ce. Especially, B may comprise aluminum (Al); however, in addition to aluminum, B may also partly comprise gallium (Ga) and/or scandium (Sc) and/or indium (In), especially up to about 20% of B, more especially up to about 10% of B (i.e. the B ions essentially consist of 90 or more mole % of Al and 10 or less mole % of one or more of Ga, Sc, and In); B may especially comprise up to about 10% gallium. In another variant, B and O may at least partly be replaced by Si and N. The element A may especially be selected from the group consisting of yttrium (Y), gadolinium (Gd), terbium (Tb) and lutetium (Lu). Further, Gd and/or Tb are especially only present up to an amount of about 20% of A. In a specific embodiment, the garnet luminescent material comprises $(Y_{1-x}Lu_x)_3B_5O_{12}$:Ce, wherein x is equal to or larger than 0 and equal to or smaller than 1. The term ":Ce", indicates that part of the metal ions (i.e. in the garnets: part of the "A" ions) in the luminescent material is replaced by Ce. For instance, in the case of $(Y_{1-x}Lu_x)_3Al_5O_{12}$:Ce, part of Y and/or Lu is replaced by Ce. This is known to the person skilled in the art. Ce will replace A in general for not more than 10%; in general, the Ce concentration will be in the range of 0.1 to 4%, especially 0.1 to 2% (relative to A). Assuming 1% Ce and 10% Y, the full correct formula could be $(Y_{0.1}Lu_{0.89}Ce_{0.01})_3Al_5O_{12}$. Ce in garnets is substantially or only in the trivalent state, as is known to the person skilled in the art.

In embodiments, the luminescent material (thus) comprises $A_3B_5O_{12}$ wherein in specific embodiments at maximum 10% of B—O may be replaced by Si—N.

In specific embodiments the luminescent material comprises $(Y_{x1-x1-x3}A'_{x2}Ce_{x3})_3(Al_{y1-y2}B'_{y2})_5O_{12}$, wherein $x1+x2+x3=1$, wherein $x3>0$, wherein $0<x2+x3<0.2$, wherein $y1+y2=1$, wherein $0<y2<0.2$, wherein A' comprises one or more elements selected from the group consisting of lanthanides, and wherein B' comprises one or more elements selected from the group consisting of Ga, In and Sc. In embodiments, x3 is selected from the range of 0.001-0.1. In the present invention, especially $x1>0$, such as $>0.2$, like at least 0.8. Garnets with Y may provide suitable spectral power distributions.

In specific embodiments at maximum 10% of B—O may be replaced by S—N. Here, B in B—O refers to one or more of Al, Ga, In and Sc (and O refers to oxygen); in specific embodiments B—O may refer to Al—O. As indicated above, in specific embodiments x3 may be selected from the range of 0.001-0.04. Especially, such luminescent materials may have a suitable spectral distribution (see however below), have a relatively high efficiency, have a relatively high thermal stability, and allow a high CRI (optionally in combination with (the) light of other sources of light as described herein). Hence, in specific embodiments A may be selected from the group consisting of Lu and Gd. Alternatively or additionally, B may comprise Ga. Hence, in embodiments the luminescent material comprises $(Y_{x1-x2-x3}(Lu,Gd)_{x2}Ce_{x3})_3(Al_{y1-y2}Ga_{y2})_5O_{12}$, wherein Lu and/or Gd may be available. Even more especially, x3 is selected from the range of 0.001-0.1, wherein $0<x2+x3<0.1$, and wherein $0<y2<0.1$. Further, in specific embodiments, at maximum 1% of B—O may be replaced by S—N. Here, the percentage refers to moles (as known in the art); see e.g. also EP3149108. In yet further specific embodiments, the luminescent material comprises $(Y_{x1-x3}Ce_{x3})_3Al_5O_{12}$, wherein $x1+x3=1$, and wherein $0<x3<0.2$, such as 0.001-0.1.

In specific embodiments, the light generating device may only include luminescent materials selected from the type of cerium comprising garnets. In even further specific embodiments, the light generating device includes a single type of luminescent materials, such as $(Y_{x1-x2-x3}A'_{x2}Ce_{x3})_3(Al_{y1-y2}B'_{y2})_5O_{12}$. Hence, in specific embodiments the light generating device comprises luminescent material, wherein at least 85 weight %, even more especially at least about 90 wt. %, such as yet even more especially at least about 95 weight % of the luminescent material comprises $(Y_{x1-x2-x3}A'_{x2}Ce_{x3})_3(Al_{y1-y2}B'_{y2})_5O_{12}$. Here, wherein A' comprises one or more elements selected from the group consisting of lanthanides, and wherein B' comprises one or more elements selected from the group consisting of Ga, In and Sc, wherein $x1+x2+x3=1$, wherein $x3>0$, wherein $0<x2+x3<0.2$, wherein $y1+y2=1$, wherein $0<y2<0.2$. Especially, x3 is selected from the range of 0.001-0.1. Note that in embodiments x2=0. Alternatively or additionally, in embodiments y2=0.

In specific embodiments, A may especially comprise at least Y, and B may especially comprise at least Al.

Alternatively or additionally, wherein the luminescent material may comprises a luminescent material of the type $A_3Si_6N_{11}:Ce^{3+}$, wherein A comprises one or more of Y, La, Gd, Tb and Lu, such as in embodiments one or more of La and Y.

In embodiments, the luminescent material may alternatively or additionally comprise one or more of $MS:Eu^{2+}$ and/or $M_2Si_5N_8:Eu^{2+}$ and/or $MAlSiN_3:Eu^{2+}$ and/or $Ca_2AlSi_3O_2N_5:Eu^{2+}$, etc., wherein M comprises one or more of Ba, Sr, and Ca, especially in embodiments at least Sr. Hence, in embodiments, the luminescent may comprise one or more materials selected from the group consisting of (Ba,Sr,Ca)S:Eu, $(Ba,Sr,Ca)AlSiN_3:Eu$ and $(Ba,Sr,Ca)_2Si_5N_8:Eu$. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by $Eu^{2+}$). For instance, assuming 2% Eu in $CaAlSiN_3:Eu$, the correct formula could be $(Ca_{0.98}Eu_{0.02})AlSiN_3$. Divalent europium will in general replace divalent cations, such as the above divalent alkaline earth cations, especially Ca, Sr, or Ba. The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Further, the material $(Ba,Sr,Ca)_2Si_5N_8:Eu$ can also be indicated as $M_2Si_5N_8:Eu$, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as $Ba_{1.5}Sr_{0.5}Si_5N_8:Eu$ (i.e. 75% Ba; 25% Sr). Here, Eu is introduced and replaces at least part of M, i.e. one or more of Ba, Sr, and Ca). Likewise, the material $(Ba,Sr,Ca)AlSiN_3:Eu$ can also be indicated as $MAlSiN_3:Eu$, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Eu in the above indicated luminescent materials is substantially or only in the divalent state, as is known to the person skilled in the art.

In embodiments, a red luminescent material may comprise one or more materials selected from the group consisting of (Ba,Sr,Ca)S:Eu, $(Ba,Sr,Ca)AlSiN_3:Eu$ and $(Ba,Sr,Ca)_2Si_5N_8:Eu$. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by $Eu^{2+}$). For instance, assuming 2% Eu in $CaAlSiN_3:Eu$, the correct formula could be $(Ca_{0.98}Eu_{0.02})AlSiN_3$. Divalent europium will in general replace divalent cations, such as the above divalent alkaline earth cations, especially Ca, Sr, or Ba.

The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Further, the material $(Ba,Sr,Ca)_2Si_5N_8:Eu$ can also be indicated as $M_2Si_5N_8:Eu$, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as $Ba_{1.5}Sr_{0.5}Si_5N_8:Eu$ (i.e. 75% Ba; 25% Sr). Here, Eu is introduced and replaces at least part of M, i.e. one or more of Ba, Sr, and Ca).

Likewise, the material $(Ba,Sr,Ca)AlSiN_3:Eu$ can also be indicated as $MAlSiN_3:Eu$, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Eu in the above indicated luminescent materials is substantially or only in the divalent state, as is known to the person skilled in the art.

Blue luminescent materials may comprise YSO ($Y_2SiO_5:Ce^3$), or similar compounds, or BAM ($BaMgAl_{10}O_{17}:Eu^{2+}$), or similar compounds.

The term "luminescent material" herein especially relates to inorganic luminescent materials. Instead of the term "luminescent material" also the term "phosphor". These terms are known to the person skilled in the art.

Alternatively or additionally, also other luminescent materials may be applied. For instance quantum dots and/or organic dyes may be applied and may optionally be embedded in transmissive matrices like e.g. polymers, like PMMA, or polysiloxanes, etc. etc.

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide ($CuInS_2$) and/or silver indium sulfide ($AgInS_2$) can also be used. Quantum dots show very narrow emission band and thus they show saturated colors. Furthermore the emission color can easily be tuned by adapting the size of the quantum dots. Any type of quantum dot known in the art may be used in the present invention. However, it may be preferred for reasons of environmental safety and concern to use cadmium-free quantum dots or at least quantum dots having a very low cadmium content.

Instead of quantum dots or in addition to quantum dots, also other quantum confinement structures may be used. The term "quantum confinement structures" should, in the context of the present application, be understood as e.g. quantum wells, quantum dots, quantum rods, tripods, tetrapods, or nano-wires, etcetera.

Organic phosphors can be used as well. Examples of suitable organic phosphor materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

Different luminescent materials may have different spectral power distributions of the respective luminescent material light. Alternatively or additionally, such different luminescent materials may especially have different color points (or dominant wavelengths).

Hence, the luminescent material may be comprised by a luminescent body. The luminescent body may be a layer, like a self-supporting layer. The luminescent body may also be a coating. Especially, the luminescent body may essentially be self-supporting. In embodiments, the luminescent material may be provided as luminescent body, such as a luminescent single crystal, a luminescent glass, or a luminescent ceramic body. Such body may be indicated as "converter body" or "luminescent body". In embodiments, the luminescent body may be a luminescent single crystal or a luminescent ceramic body. For instance, in embodiments a cerium comprising garnet luminescent material may be provided as a luminescent single crystal or as a luminescent ceramic body. In other embodiments, the luminescent body may comprise a light transmissive body, wherein the luminescent material is embedded. For instance, the luminescent body may comprise a glass body, with luminescent material embedded therein. Or the glass as such may be luminescent. In other embodiments, the luminescent body may comprise a polymeric body, with luminescent material embedded therein. The afore-mentioned may apply to the luminescent material.

In specific embodiments, the luminescent body may comprise a ceramic body or a single crystal.

The luminescent body may comprise a first face, a second face, and an edge bridging face, bridging the first face and the second face. Especially, the luminescent body is a transparent body, at least in a direction perpendicular to the first face and/or the second face. Especially, the luminescent body is transparent for visible light propagating in a direction perpendicular to the first face or the second face. Hence, even though the luminescent body may absorb part of the first device light would it be provided perpendicular to one or more of the first face and the second face, a substantial part may not be absorbed. For wavelengths in the visible where the luminescent material does not absorb, the luminescent body may be transparent in a direction perpendicular to the first face and/or the second face but also in a direction parallel to the first face and/or the second face.

The luminescent body may be relatively thin. This may allow a relatively large area to be in contact with a thermally conductive material (see further also below).

Hence, in embodiments the luminescent body comprises a first face, a second face, and a bridging face bridging the first face and the second face.

The second face may have a second face equivalent circular diameter D2. Further, the first face may have a first face equivalent circular diameter D1. In embodiments D1=D2. In other embodiments, D1 D2. In the case of a cylindrical shape or a cylindrically-like shape, like a hexagonal cylinder, D1=D2. Should the luminescent body have conical or conical like shape, like a truncated cone, D1 D2. Hence, in specific embodiments, the luminescent body has a cylindrical shape or a cylindrically-like shape, like a hexagonal cylinder, wherein D1=D2.

The equivalent circular diameter (or ECD) (or "circular equivalent diameter") of an (irregularly shaped) two-dimensional shape is the diameter of a circle of equivalent area. For instance, the equivalent circular diameter of a square with side a is 2*a*SQRT(1/π). For a circle, the diameter is the same as the equivalent circular diameter. Would a circle in an xy-plane with a diameter D be distorted to any other shape (in the xy-plane), without changing the area size, than the equivalent circular diameter of that shape would be D.

The distance between the first face and the second face may in embodiments be constant. This distance may be indicated as height. Hence, in embodiments the bridging face has a first height (H1).

In specific embodiments, the luminescent body has a smaller height than at least one of the equivalent diameters, especially smaller than the equivalent diameter of the first face. This may allow a good thermal contact of the first face with the one or more thermally conductive bodies. Hence, especially $H1/D2<1$ may apply. For instance, in embodiments $0.01<H1/D2<0.5$, such as $0.02<H1/D2<0.5$. Especially, H1 may be selected from the range of 0.1-10 mm and/or D1 may be selected from the range of 1-20 mm, more especially H1 may be selected from the range of 0.2-2 mm and/or D1 may be selected from the range of 2-10 mm.

In embodiments, the luminescent body may have a cross-sectional shape selected from (a) k-gonal, wherein k≥4, and (b) cylindrical. For instance, the luminescent body may have a hexagonal shape (k=6), octagonal shape (k=8), decagonal shape (k=10), etc. In embodiments, however, k is selected from the range of 4-24, such as 6-24. In other embodiments, however, the cross-section shape is circular (k may be considered o). In embodiments that the luminescent body has a k-gonal cross-section, the bridging face may comprise k facets.

The bridging face defines a perimeter. The perimeter has a length, which is in the case of a circular cross-section 2*π*R, and has a height H1, i.e. the height of the bridging face. Instead of the term "perimeter" or "bridging face", also the term "side face" may be used. The term "perimeter" herein may refer to the length of the bridging face as well as to the bridging face itself. Hence, the bridging face may have a perimeter (P).

The luminescent body may have a body axis. This body axis may be perpendicular to the first face (and/or the second face). Further, this body axis may coincide with an optical axis (see also below).

As indicated above, the first face may be in thermal contact with a thermally conductive body. Hence, the system comprises one or more thermally conductive bodies. At least one of these one or more thermally conductive bodies may be in thermal contact with the first face, such as in physical contact therewith.

The thermally conductive body or bodies comprise a thermally conductive material. A thermally conductive material may especially have a thermal conductivity of at least about 20 W/(m*K), like at least about 30 W/(m*K), such as at least about 100 W/(m*K), like especially at least about 200 W/(m*K). In yet further specific embodiments, a thermally conductive material may especially have a thermal conductivity of at least about 10 W/(m*K). In embodiments, the thermally conductive material may comprise one or more of copper, aluminum, silver, gold, silicon carbide, aluminum nitride, boron nitride, aluminum silicon carbide, beryllium oxide, a silicon carbide composite, aluminum silicon carbide, a copper tungsten alloy, a copper molybdenum carbide, carbon, diamond, and graphite. Alternatively, or additionally, the thermally conductive material may comprise or consist of aluminum oxide.

An element may be considered in thermal contact with another element if it can exchange energy through the process of heat. Hence, the elements may be thermally coupled. In embodiments, thermal contact can be achieved by physical contact. In embodiments, thermal contact may be achieved via a thermally conductive material, such as a thermally conductive glue (or thermally conductive adhesive). Thermal contact may also be achieved between two elements when the two elements are arranged relative to each other at a distance of equal to or less than about 10 pm, though larger distances, such as up to 100 μm may be possible. The shorter the distance, the better the thermal contact. Especially, the distance is 10 μm or less, such as 5 μm or less, such as 1 μm or less. The distance may be the distanced between two respective surfaces of the respective elements. The distance may be an average distance. For instance, the two elements may be in physical contact at one or more, such as a plurality of positions, but at one or more, especially a plurality of other positions, the elements are not in physical contact. For instance, this may be the case when one or both elements have a rough surface. Hence, in embodiments in average the distance between the two elements may be 10 μm or less (though larger average distances may be possible, such as up to 100 μm). In embodiments, the two surfaces of the two elements may be kept at a distance with one or more distance holders. When two elements are in thermal contact, they may be in physical contact or may be configured at a short distance of each other, like at maximum 10 μm, such as at maximum 1 mm. When the two elements are configured at a distance from each other, an intermediate material may be configured in between, though in other embodiments, the distance between the two elements may filled with a gas, liquid, or may be vacuum. When an intermediate material is available, the larger the distance, the higher the thermal conductivity may be useful for thermal contact between the two elements. However, the smaller the distance, the lower the thermal conductivity of the intermediate material may be (of course, higher thermal conductive materials may also be used).

The one or more thermally conductive bodies (or thermal conductive bodies) may comprise, or consist of, one thermally conductive body or two or more thermally conductive bodies. The one or more thermally conductive bodies may also consist of two body parts, that are physically coupled. Especially, the one or more thermally conductive bodies herein comprise a first thermally conductive body part, in thermal contact with at least part of the first face, and/or a second thermally conductive body part, in thermal contact with one or more of (i) part of the bridging face and (ii) part of the second face. Especially, in embodiments the one or more thermally conductive bodies comprise: (a) a first thermally conductive body part, in thermal contact with at least part of the first face; and (b) a second thermally conductive body part, in thermal contact with one or more of (i) part of the bridging face and (ii) part of the second face.

In embodiments, at least 50% of the area of the first face may be in thermal contact with the first thermally conductive body, such as at least 80% of the area, like at least 90% of the area.

When the second thermally conductive body part is configured in thermal contact with the bridging face, it is configured in thermal contact with part of the bridging face, in view of the light incoupling (see also below). When the second thermally conductive body part is configured in thermal contact with the second face, it is configured in thermal contact with part of the second face, in view of the light outcoupling (see also below).

Especially, the one or more thermally conductive bodies comprise a reflective material or comprise a reflective coating. Under perpendicular irradiation, the reflection may be at least 50%, such as at least 70%, like at least 85%. The one or more thermally conductive bodies may be reflective for the first device light and/or for the luminescent material light.

In this way, the first thermally conductive body part and the second thermally conductive body part may define a slit-like opening along at least part of the perimeter (P) of the bridging face.

The slit like opening may have a length, defined along the perimeter, of at least 80% of the length of the perimeter, like at least 90%, such as even 100%. For instance, the luminescent body may be sandwiched between the first thermally conductive body part and the second thermally conductive body part, thereby providing a slit-like opening having a length along the perimeter identical to the length of the perimeter.

The term "slit-like opening" is applied as the opening may have a relatively small height, equal to, in some embodiments even smaller than, the first height H1.

To generate the luminescent material light, first device light may be guided via the slit-like opening. Luminescent material light generate can escape via at least part of the second face. The entire second face may be available when the second thermally conductive body is not in thermal contact with the second face, or part of the second face may be available when the second thermally conductive body is in thermal contact with the second face. Especially, at least 50%, more especially at least 70%, such as at least 80%, like more especially at least about 90% of the area of the second face may be available four outcoupling of the luminescent material light. Hence, in embodiments less than about 50% of area the second face may be in thermal contact with the second thermally conductive body, such as less than about 30%, like less than about 20%, such as especially less than about 10%.

Hence, in embodiments the second thermally conductive body part may have an opening, such that at least part of the second face is not in thermal contact with the second thermally conductive body part. Thereby, light may escape from the luminescent body via the second face to the external of the system.

Hence, in embodiments the second thermally conductive body part may have a ring shape and/or the first thermally conductive body part may in embodiments have a (substantially closed) cylindrical shape.

During operation, at least part of the luminescent material light may (thus) escape from at least part of said second face and leave the system via the second thermally conductive body part (and e.g. optional optics).

To guide the first device light via the slit-like opening, it may be desirable that the device light is provided as a circular beam, substantially focusing to a ring located at about the bridging face (or perimeter). Focusing may be on the bridging face, or at a short distance upstream thereof, or a short distance from the bridging face into the luminescent body, such as within a value of +/−10% of D1 relative to the perimeter, like within +/−5% of D1 relative to the perimeter. Hence, the first light generating device and the one or more optical elements may be configured to provide the first device light via the slit-like opening to the luminescent body.

The slit-like opening may define a part of the bridging face that is accessible by the device light. This part may also be indicated as light-incoupling part. This may be essentially 100% would the luminescent body (only) be sandwiched between the between the first thermally conductive body part and the second thermally conductive body part. However, would one of the first thermally conductive body part and the second thermally conductive body part be in thermal contact with part of the bridging face, the part of the bridging face that is accessible by the device light may be smaller than 100% of the bridging (area). Likewise, this percentage may be smaller when there are bridging elements between the first thermally conductive body part and the second thermally conductive body part.

Especially, however, the light incoupling part may be configured over the entire perimeter (P).

To define the light-incoupling part, the part of the bridging face that is accessible by light propagating parallel to the first face (and/or the second face) may be taken. This may thus be light travelling perpendicular to the optical axis and/or the body axis of the luminescent body.

The bridging face may have a third area A3. The light incoupling part may have an area Al or first area. In embodiments 100% of the third area may be accessible by the device. In such embodiments, A1=A3. However, in other embodiment the area of the light incoupling part may be smaller. However, it may be less desirable that this light incoupling part area is substantially smaller than the area A3 of the bridging part. Hence, in embodiments $0.25 \leq A1/A3 \leq 1$, more especially $0.5 \leq A1/A3 \leq 1$, such as $0.75 \leq A1/A3 \leq 1$.

Hence, in specific embodiments the light incoupling part is configured over the entire perimeter (P). Therefore, in embodiments the slit-like opening may define a light incoupling part of the bridging face, configured to receive the first device light, wherein the light incoupling part is configured over the entire perimeter (P).

Especially, a substantial part of the light incoupling part is irradiated by the device light. Hence, assuming a fourth area A4 to be the area of the bridging face that receives the device light, A4 may especially be at least 50% of the light incoupling area Al, such as at least about 70%, more especially at least about 80%, such as at least about 90%. Especially, $0.25 \leq A4/A3 \leq 1$, more especially $0.5 \leq A1/A3 \leq 1$, such as $0.75 \leq A1/A3 \leq 1$.

Hence, the slit-like opening may define a light incoupling part of the bridging face, configured to receive the first device light; wherein the light incoupling part is configured along at least part of the perimeter (P); wherein the light incoupling part has a light incoupling part area Al.

In embodiments, the light incoupling part may have a second height (H2). Especially, in embodiments $0.1 < H2/H1 < 1$.

The light incoupling part area and an area of the second face, i.e. the second area A2, may be related.

In order to improve light incoupling, the area Al of the light incoupling part may be larger than the second area A2 of the second face, with a range of $1.1 \leq A1/A2 < 8$. In embodiments, $1.25 \leq A1/A2 < 8$, like more especially $1.5 \leq A1/A2 < 8$.

However, in order to improve light outcoupling, it may be desirable that the area A2 of the second face is larger than the area Al of the light incoupling part. Hence, in other embodiments $0.05 \leq A1/A2 < 1.1$, such as in embodiments $0.1 \leq A1/A2 < 1$, like in embodiments $0.25 \leq A1/A2 < 1$, such as especially $0.25 \leq A1/A2 < 0.75$.

Different solutions may be possible to provide the substantially circular beam. One may create a substantially circular beam with one or more light generating devices. Several embodiments are described below.

In a first series of embodiments, the one or more optical elements comprise one or more first optical elements. Especially, the light generating system may comprise n sets (or arrangements) of a first light generating device and the one or more first optical elements. In embodiments, the first light generating device and the one or more first optical elements may be configured to provide the first device light via the slit-like opening to the luminescent body. In embodiments $n \geq 1$, such as $n \geq 2$, like $n \geq 4$. Especially, $3 < n < 72$, such as $3 < n < 24$, though other values of n may certainly be possible. Hence, in embodiments the one or more optical elements comprise one or more first optical elements, wherein the light generating system comprises n sets of a first light generating device and the one or more first optical elements, wherein the first light generating device and the one or more first optical elements are configured to provide the first device light via the slit-like opening to the luminescent body, wherein $n \geq 1$. With a plurality of arrangements of a first light generating device and the one or more first optical elements a substantially circular beam may be provided which may irradiate in embodiments e.g. at least 50%, such as at least 60%, more especially at least 70%, like at least 80% of the area of the bridging face.

In specific embodiments, the one or more first optical elements may comprise a first cylindrical lens, configured downstream of the first light generating device, and a first half-cylindrical lens configured downstream of the first cylindrical lens. This may be a relatively easy way to create a narrow beam that can enter the slit-like opening.

Especially, in embodiments wherein $n \geq 2$, mutual angles $\alpha_{sm}$ between optical axes Os of the sets may comply with $\alpha_{sm} \neq 360°/n$ when n is even. This may prevent that a first set irradiates the second set, and vice versa, by which one or more elements of the sets may be damaged.

Alternatively or additionally, the one or more optical elements may comprise one or more second optical elements, wherein the one or more second optical elements comprise a first axicon lens, configured downstream of the first light generating device, and a second cylindrical reflector, configured downstream of the first axicon lens. Especially, the first light generating device and the one or more second optical elements may be configured to focus a ring-shaped beam of first device light via the slit-like opening on the luminescent body. Especially, in embodiment the second cylindrical reflector may comprise a truncated compound parabolic reflector. With the first light generating device and the one or more second optical elements a substantially circular beam may be provided which may irradiate in embodiments e.g. at least 50%, such as at least 60%, more especially at least 70%, like at least 80% of the area of the bridging face.

The luminescent body may in embodiments be relatively transparent, especially for light propagating through the luminescent body in a direction parallel to the body axis. However, for propagating through the luminescent body in a direction perpendicular to the body axis, the absorption for the first device light may be relatively high. For instance, the material of the luminescent body, such as the activator concentration in embodiments, and the dimensions, may be selected such that only a small part of the first device light may escape again from the luminescent body via the edge face. Hence, in embodiments an absorption of the first device light through the luminescent body parallel to the first face may be selected such that at least 90% (such as at least 95%, or even at least about 98%) of the first device light propagating from one part of the bridging face in the direction (parallel to one or more of the first face (2010 and the second face) of an opposite part of the bridging face may be absorbed by the luminescent body. In specific embodiments, a diameter (D) of the luminescent body may be at least 4 times an absorption length for the first device light. Would the luminescent body have an k-gonal shape, instead of the diameter, a width (perpendicular to the body axis) may be chosen.

In embodiments, the luminescent body may comprise light outcoupling structures configured to couple part of the first device light out via the second face. This may allow admixing the luminescent material light and the first device light in the system light (see also below). The outcoupling structures may in embodiments comprise indentations in one or more of the first face and the second face, and/or particulate material in the luminescent body, as known in the art.

In embodiments, the light generating system may further comprise a dichroic layer on at least part of the bridging face. The dichroic layer may be configured to transmit first device light and to reflect luminescent material light. This may reduce escape of the luminescent material light via the bridging face, and may thus promote escape of the luminescent from the luminescent body via the second face.

In embodiments, the one or more thermally conductive bodies comprise one or more heatsinks or the one or more thermally conductive bodies are comprised by a heatsink. Especially, the first thermally conductive body may be a heatsink or may be comprised by a heatsink. In other embodiments, at least one of the one or more thermally conductive bodies may be in thermal contact.

The system may generate, during operation, system light, which may especially comprise the luminescent material light, and optionally the first device light. However, alternatively or additionally, the system light may also comprise second device light. This may be admixed in the system light downstream of the luminescent body, or may generated upstream of the luminescent body, and be transmitted (or reflected) by the luminescent body.

The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

Especially, the second device may generate second device light. In specific embodiments, the second device light may be generated upstream of the luminescent body, and may be transmitted by the luminescent body. To this end, the first thermally conductive body part may comprise an opening, herein also indicated as "first thermally conductive body part opening". Such opening may be a pinhole. The cross-sectional area of the first thermally conductive body part opening may in embodiments be not more than 10% of the area of the first face.

Therefore, in embodiments the light generating system may further comprise a second light generating device, wherein the second light generating device may be configured to generate second device light having a spectral power distribution different from one or more of (i) the first device light and (ii) the luminescent material light; wherein the first thermally conductive body part comprises a first thermally conductive body part opening, wherein the second light generating device is configured to irradiate the first face of the luminescent body via the first thermally conductive body part opening, wherein an absorption of the second device light through the luminescent body perpendicular to the first face (and/or the second face) is selected such that at least 90% of the second device light propagating from the first face in the direction of second face is transmitted through the luminescent body. Especially, in such embodiments the first height (H1) of the luminescent body may be less than 0.5 times an absorption length for the second device light.

In embodiments, the first light generating device may be configured to generate blue first device light.

The terms "violet light" or "violet emission" especially relates to light having a wavelength in the range of about 380-440 nm. The terms "blue light" or "blue emission" especially relates to light having a wavelength in the range of about 440-495 nm (including some violet and cyan hues). The terms "green light" or "green emission" especially relate to light having a wavelength in the range of about 495-570 nm. The terms "yellow light" or "yellow emission" especially relate to light having a wavelength in the range of about 570-590 nm. The terms "orange light" or "orange emission" especially relate to light having a wavelength in the range of about 590-620 nm. The terms "red light" or "red emission" especially relate to light having a wavelength in the range of about 620-780 nm. The term "pink light" or "pink emission" refers to light having a blue and a red component. The term "cyan" may refer to one or more wavelengths selected from the range of about 490-520 nm. The term "amber" may refer to one or more wavelengths selected from the range of about 585-605 nm, such as about 590-600 nm. The phrase "light having one or more wavelengths in a wavelength range" and similar phrases may especially indicate that the indicated light (or radiation) has a spectral power distribution with at least intensity or intensities at these one or more wavelengths in the indicate wavelength range. For instance, a blue emitting solid state light source will have a spectral power distribution with intensities at one or more wavelengths in the 440-495 nm wavelength range.

The spectral power distribution on the basis of the luminescent material emission and optionally the first device light, may have a spectral power distribution which may be desirable for some applications but may not be desirable for some other applications. Hence, in embodiments system may further comprise a second source of light, especially the second light generating device.

Especially, the second source of light may be configured to generate second light, having a spectral power distribution different from (a) the first device light, and (b) the luminescent material emission. Especially, the difference may be in the color point. Hence, the spectral power distributions are different. Further, the difference may thus be in embodiments in the centroid wavelength. In embodiments, the second source of light is or provides light have a color different from the color of the luminescent material emission. For instance, in embodiments (a) the second source of light and (b) the luminescent material emission and (c) the first device light may be selected from green, yellow, orange, and red. For instance, in embodiments the second source of light may be selected from orange, and red, and the luminescent material emission may be one or more of yellow and green. However, other combinations may also be possible.

In specific embodiments, colors, or color points of a first type of light and a second type of light may be different when the respective color points of the first type of light and the second type of light differ with at least 0.01 for u' and/or with at least 0.01 for v', even more especially at least 0.02 for u' and/or with at least 0.02 for v'. In yet more specific embodiments, the respective color points of first type of light and the second type of light may differ with at least 0.03 for u' and/or with at least 0.03 for v'. Here, u' and v' are color coordinate of the light in the CIE 1976 UCS (uniform chromaticity scale) diagram.

Hence, (a) the second source of light and (b) the luminescent material emission and first device light may in embodiments differ with at least 0.02 for u' and/or with at least 0.02 for v', or more.

Spectral power distributions of different sources of light having centroid wavelengths differing least 10 nm, such as at least 20 nm, or even at least 30 nm may be considered different spectral power distributions, e.g. different colors.

However, the second light generating device may optionally also be used to generate essentially the same light as the first device light, such as blue light, as for instance the first device light entering the luminescent body via the bridging face may essentially be absorbed by the luminescent material.

In specific embodiments, colors, or color points of a first type of light and a second type of light may be essentially the same when the respective color points of the first type of light and the second type of light differ with at maximum 0.1 for u' and/or with at maximum 0.1 for v', even more especially at maximum 0.05 for u' and/or with at maximum 0.05 for v'. In more specific embodiments, colors, or color points of a first type of light and a second type of light may be essentially the same when the respective color points of the first type of light and the second type of light differ with at maximum 0.03 for u' and/or with at maximum 0.03 for v', even more especially at maximum 0.02 for u' and/or with at maximum 0.02 for v'. In yet more specific embodiments, the respective color points of first type of light and the second type of light may differ with at maximum 0.01 for u' and/or with at maximum 0.01 for v'. Here, u' and v' are color coordinate of the light in the CIE 1976 UCS (uniform chromaticity scale) diagram.

Therefore, in specific embodiments the second light generating device is configured to generate second device light having spectral intensity in one or more of the blue wavelength range and the red wavelength range; wherein the light generating system is configured to generate system light comprising the luminescent material light and the second device light.

In embodiments, the light generating system may be configured to provide white system light in an operational mode of the light generating system. This does not imply that the light generating system necessarily always generates white system light. In other embodiments, in another operational mode, the light generating system may be configured to provide colored system light.

The term "white light", and similar terms, herein, is known to the person skilled in the art. It may especially relate to light having a correlated color temperature (CCT) between about 1800 K and 20000 K, such as between 2000 and 20000 K, especially 2700-20000 K, for general lighting especially in the range of about 2000-7000 K, such as in the range of 2700 K and 6500 K. In embodiments, e.g. for backlighting purposes, or for other purposes, the correlated color temperature (CCT) may especially be in the range of about 7000 K and 20000 K. Yet further, in embodiments the correlated color temperature (CCT) is especially within about 15 SDCM (standard deviation of color matching) from the BBL (black body locus), especially within about 10 SDCM from the BBL, even more especially within about 5 SDCM from the BBL.

In specific embodiments, the correlated color temperature (CCT) may be selected from the range of 6000-12000 K, like selected from the range of 7000-12000 K, like at least 8000 K. Yet further, in embodiments the correlated color temperature (CCT) may be selected from the range of 6000-12000 K, like selected from the range of 7000-12000 K, in combination with a CRI of at least 70. In specific embodiments, the system light is white light and has correlated color temperature selected from a range from 1800 K to 12000 K, and a color rendering index of at least 70.

The term "second light generating device" may also refer to a plurality of second light generating devices. The term "second light generating device" may also refer to a plurality of different second light generating devices. The light of the second light generating devices may be admixed to the system light at the same or at different positions (see also above for some examples of positions).

In embodiments, the second light generating device may be configured to generate red device light, such as red laser light, and/or the first light generating device may be configured to generate blue first device light, such as blue laser light.

The light generating system may further comprise a control system (see also above). The control system may be configured to control (i) the first light generating device, or (ii) the optional second light generating device.

The phrase "controlling the first light generating device", and similar phrases, may refer to embodiments wherein there is a single first light generating device, but may in other embodiments also comprise controlling two or more (essentially identical) first light generating devices, such as lasers from the same bin. Likewise, the phrase "controlling the second light generating device", and similar phrase, may refer to embodiments wherein there is a single second light generating device, but may in other embodiments also comprise controlling two or more (essentially identical) second light generating devices, such as lasers from the same bin.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc.. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or I-phone, a tablet, etc. The device is thus not necessarily coupled to the lighting system, but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, WIFI, LiFi, ZigBee, BLE or WiMAX, or another wireless technology.

The system, or apparatus, or device may execute an action in a "mode" or "operation mode" or "mode of operation" or "operational mode". The term "operational mode may also be indicated as "controlling mode". Likewise, in a method an action or stage, or step may be executed in a "mode" or "operation mode" or "mode of operation" or "operational mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

With such system, it may be possible to provide light having a controllable spectral power distribution. Further, with such system it may be possible to provide light having a controllable correlated color temperature and/or a controllable color rendering index. Yet, with such system it may be possible to provide a spectral power distribution partially or substantially conformal to the spectral power distribution (in the visible) of a black body radiator (emission). The fact that the light generating system may be configured to generate (white) system light, does not exclude embodiments of the system, wherein the system may also be able to operate or be operated in other operational modes. Especially, in embodiments the spectral power distribution of the system light may be controllable. Hence, in embodiments in a first operational mode (of the light generating system), the light generating system may be configured to generate the white system light and in a second operational mode (of the light generating system) the light generating system may be configured to generate non-white system light.

Therefore, in embodiments the light generating system may further comprise a control system configured to control a spectral power distribution of the system light.

Especially, the control system may be configured to control the correlated color temperature of the system light at a value selected from the range of 1800-12000 K, such as selected from the range of 1800-6500 K, though other values are herein not excluded (see also above).

In specific embodiments, the correlated color temperature of the system light may be controllable over a CCT control range of at least 500 K within the range of 1800-12000 K, such as selected from the range of 1800-6500 K, such as controllable over a CCT control range of at least 1000 K. For instance, the CCT of the system light may controllable between 2700-4000 K (i.e. over a CCT control range of 1300 K), or over a range of 2000-4500 K (i.e. over a CCT control range of 2500 K). Hence, in embodiments, the CCT (of the white system light) may be controlled from a first value T1 to a second value T2, wherein $|T2-T1|>500$ K, more especially $|T2-T1|>1000$ K.

In embodiments, R9 (of the (white) system light) may be at least 0, such as especially at least 20, or even more especially at least 30. Alternatively, the R9 value may be controllable, such as over a range of at least 20 (like e.g. between 20-40). In specific embodiments, the control system may be configured to control (in the first operational mode (of the light generating system)) the R9 value of the system light at a value of at least 30; wherein the R9 value of the system light may be controllable over a R9 control range of at least 30, wherein the R9 control range at least partly overlaps with the range of at least 30. Further, in specific embodiments (in the first operational mode (of the light generating system)) the color rendering index of the system light may be at least 80. In embodiments, the control system may be configured to control the R9 value of the system light at a value of at least 30.

In embodiments, the control system may be configured to control the color rendering index (CRI) of the system light at least 60, more especially at least 70, yet even more especially at least 80. In embodiments, the R9 value (of the white system light) may be controlled from a first R9 value R9.1 to a second R9 value R9.2, wherein $|R9.2-R9.1|\geq 30$. Note that the CRI may also depend upon the spectral power composition. Hence, different types of white light may have different CRI values and/or different R9 values. In embodiments the control system may be configured to control (in an operational mode) the CRI value of the system light within a predetermined CRI range.

In embodiments, the system may comprise a light exit, like an end window or an (other) optical element, from which the system light may escape to the external of the system. The system may comprise a housing, comprising such light exit. The housing may at least partly enclose one or more light generating devices and one or more (other) optical elements.

The system may comprise optics to combine and/or mixed light from different sources. Such optics may e.g. be configured downstream of the luminescent body.

The term "optics" may especially refer to (one or more) optical elements. Hence, the terms "optics" and "optical elements" may refer to the same items. The optics may include one or more or mirrors, reflectors, collimators, lenses, prisms, diffusers, phase plates, polarizers, diffractive elements, gratings, dichroics, arrays of one or more of the afore-mentioned, etc. Alternatively or additionally, the term "optics" may refer to a holographic element or a mixing rod. In embodiments, the optics may include one or more of beam expander optics and zoom lens optics. In embodiments, the optics may comprise an integrator, like a "Koehler integrator" (or "Kohler integrator"). Especially, the optics may be used for beam shaping and/or light mixing of the first device light, the second device light, the luminescent material light, and the optional third device light.

In embodiments, semi-transparent mirrors may be applied to combine different beams of light.

In specific embodiments, a compact package may e.g. be provided. For instance, in embodiments the system may comprise an integrated light source package, wherein the integrated light source package comprises a common support member configured to support one or more of (i) the first light generating device, (ii) at least one of the one or more thermally conductive bodies, (iii) the luminescent body, (iv) optional optics, (v) the optional second light generating device, etc.. Optionally, the common support member may comprise a thermally conductive support. The thermally conductive support may comprise one or more of a heatsink, a heat spreader, and a vapor chamber.

The light generating system may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, digital projection, or LCD backlighting. The light generating system (or luminaire) may be part of or may be applied in e.g. optical communication systems or disinfection systems.

In yet a further aspect, the invention also provides a lamp or a luminaire comprising the light generating system as defined herein. The luminaire may further comprise a housing, optical elements, louvres, etc. etc. The lamp or luminaire may further comprise a housing enclosing the light generating system. The lamp or luminaire may comprise a light window in the housing or a housing opening, through which the system light may escape from the housing. In yet a further aspect, the invention also provides a projection device comprising the light generating system as defined herein. Especially, a projection device or "projector" or "image projector" may be an optical device that projects an image (or moving images) onto a surface, such as e.g. a projection screen. The projection device may include one or more light generating systems such as described herein. Hence, in an aspect the invention also provides a lighting device selected from the group of a lamp, a luminaire, a projector device, a disinfection device, a photochemical reactor, and an optical wireless communication device, comprising the light generating system as defined herein. The lighting device may comprise a housing or a carrier, configured to house or support, one or more elements of the light generating system. For instance, in embodiments the lighting device may comprise a housing or a carrier, configured to house or support one or more of the first laser device, the third laser device, and the fourth laser device.

The terms "visible", "visible light" or "visible emission" and similar terms refer to light having one or more wavelengths in the range of about 380-780 nm. Herein, UV may especially refer to a wavelength selected from the range of 190-380 nm, such as 200-380 nm. The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to (at least) visible light.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1:
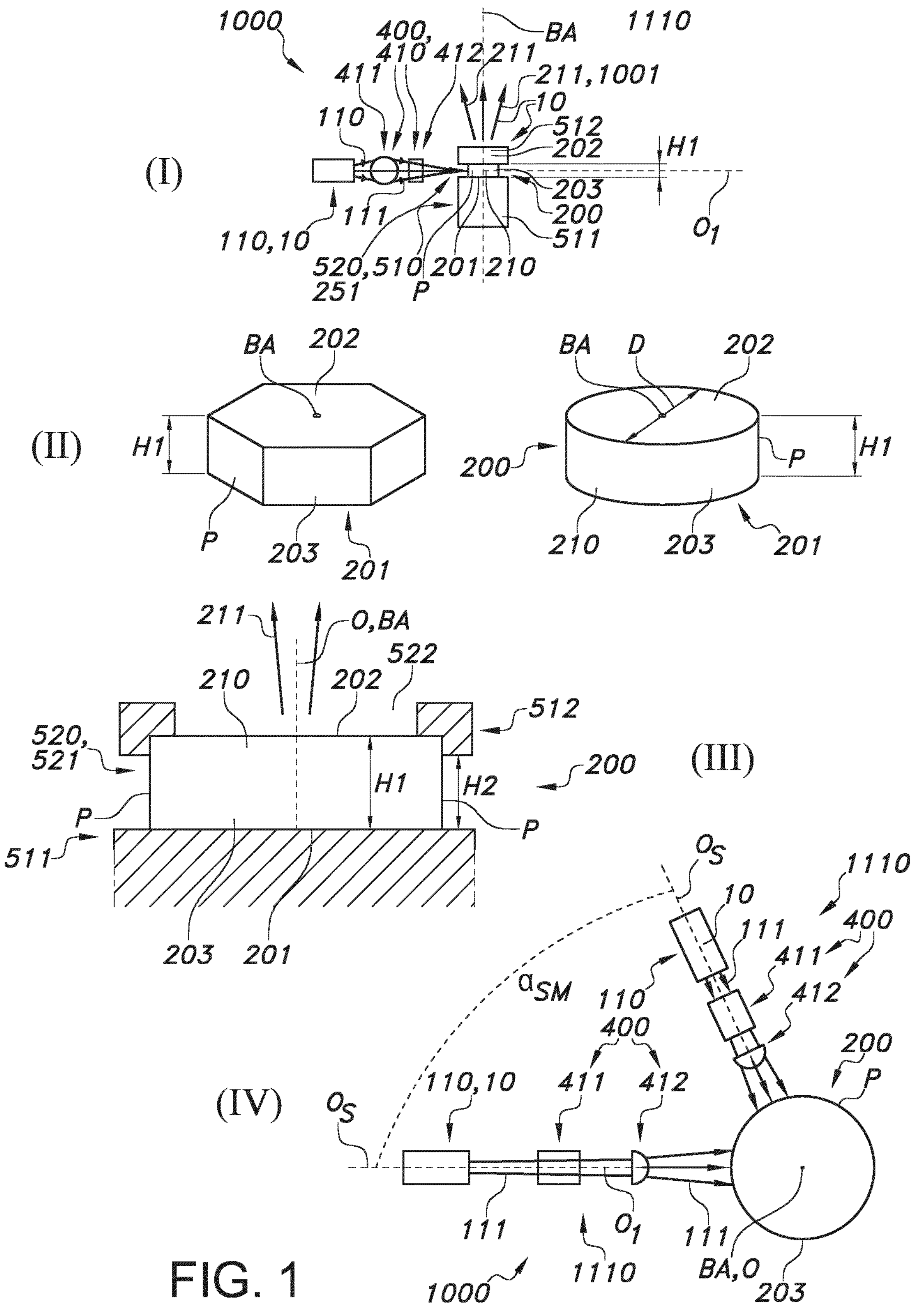
FIG. 1 schematically depict some embodiments and aspects.

Referring to FIG. 1, in embodiments a light generating system 1000 may comprise first light generating device 110, a luminescent body 200, one or more thermally conductive bodies 510, and one or more optical elements 400.

The first light generating device 110 may be configured to generate first device light 111. The first light generating device 110 may comprise a first light source 10 selected from the group of a superluminescent diode and a laser (especially a diode laser/laser diode).

The luminescent body 200 may comprise a luminescent material 210 configured to convert at least part of the first device light 111 into luminescent material light 211.

The luminescent body 200 may comprise a first face 201, a second face 202, and a bridging face 203 bridging the first face 201 and the second face 202. The second face 202 has a second face equivalent circular diameter D2. The bridging face 203 has a first height H1 and a and a perimeter P. Especially, $H1/D2<1$.

The one or more thermally conductive bodies 510 comprise: a first thermally conductive body part 511, in thermal contact with at least part of the first face 201, and a second thermally conductive body part 512, in thermal contact with one or more of (i) part of the bridging face 203 and (ii) part of the second face 202.

The first thermally conductive body part 511 and the second thermally conductive body part 512 may define a slit-like opening 520 along at least part of the perimeter (P) of the bridging face 203.

The first light generating device 110 and the one or more optical elements 400 may be configured to provide the first device light 111 via the slit-like opening 520 to the luminescent body 200.

Embodiments I and IV show embodiment(s), such as further explained below. Embodiment I is a side view or cross-sectional view, e.g. along an optical axis 01 of the light generating device 110. Embodiment IV shows a top view or cross-sectional view, in a plane perpendicular to a body axis. Reference BA indicates a body axis of the luminescent body 200.

Embodiments II show an example of a k-gonal luminescent body 200, wherein k=6, and a luminescent body 200 having a circular cross-section.

The slit-like opening 520 may define a light incoupling part 251 of the bridging face 203, configured to receive the first device light 111. The light incoupling part 251 may be configured along at least part of the perimeter P. The light incoupling part 251 has a light incoupling part area Al. The second face 202 has a second area A2. In embodiments, 0.5≤A1/A2<8, such as 1.5≤A1/A2<8. Alternatively, in embodiments 0.05≤A1/A2<1.5.

In embodiments, the bridging face 203 has a third area A3. In embodiments, 0.5≤A1/A3≤1.

The area A4 of the light incoupling part 251 may be smaller than the area of the bridging face 203, as schematically depicted in embodiment III. In this embodiment, by way of example the second thermally conductive body part 512 may be in thermal contact with part of the bridging face 203 and part of the second face 202.

The second thermally conductive body part 512 may have an opening 522, such that at least part of the second face is not in thermal contact with the second thermally conductive body part 512, allowing light to escape from the luminescent body 200 via the second face 202 to external of the system.

The luminescent body 200 may comprise a ceramic body or a single crystal. The luminescent material 210 may comprise a luminescent material of the type $A_3B_5O_{12}$:Ce, A may comprise one or more of Y, La, Gd, Tb and Lu, and B may comprise one or more of Al, Ga, In and Sc.

In embodiments, the luminescent body 200 has a cross-sectional shape selected from (a) k-gonal, with k≥4, and (b) cylindrical.

The one or more optical elements 400 comprise one or more first optical elements 410. The light generating system 1000 may comprise n sets 1110 of a first light generating device 110 and the one or more first optical elements 410. The first light generating device 110 and the one or more first optical elements 410 are configured to provide the first device light 111 via the slit-like opening 520 to the luminescent body 200, N>1. Embodiments I and IV schematically depict such embodiment.

In embodiments, the one or more first optical elements 410 comprise a first cylindrical lens 411, configured downstream of the first light generating device 110, and a first half-cylindrical lens 412 configured downstream of the first cylindrical lens 411.

In embodiments, when n≥2, mutual angles $\alpha_{sm}$ between optical axes Os of the sets 1110 comply with $\alpha_{sm}$360°/n when n may be even.

The cylinder/half-cylinder solution may be a relatively simple solution. But other lens/mirror optical solutions may also be possible, such as using (a-)spherical (a-)stigmatic elements to create a line-shaped focus from a diode laser. For instance, in embodiments instead of two separate lenses as described here, one single lens can be used that may have a cylindrical entry and exit surfaces with the respective cylinder axes orthogonally oriented.

Figure 2A:
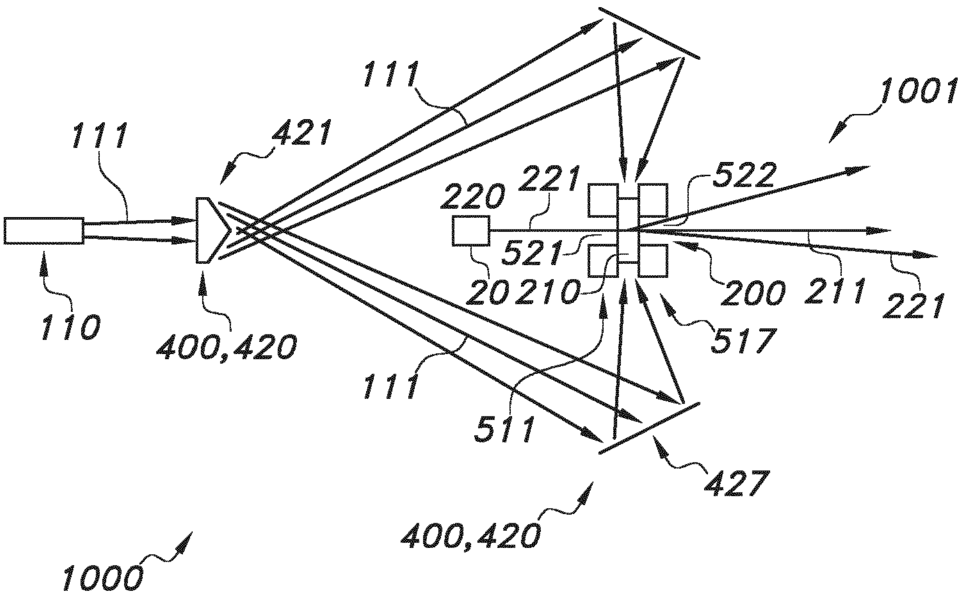
FIGS. 2*a*-2*b* schematically depict some embodiments.

In embodiments, the one or more optical elements 400 comprise one or more second optical elements 420. The one or more second optical elements 420 comprise a first axicon lens 421, configured downstream of the first light generating device 110, and a second cylindrical reflector 422, configured downstream of the first axicon lens 421. The first light generating device 110 and the one or more second optical elements 420 are configured to focus a ring-shaped beam of first device light 111 via the slit-like opening 520 on the luminescent body 200. In embodiments, the second cylindrical reflector 422 may comprise a truncated compound parabolic reflector. This is schematically depicted in FIG. 2*a*.

In embodiments, an absorption of the first device light 111 through the luminescent body 200 parallel to the first face 201 may be selected such that at least 90% of the first device light 111 propagating from one part of the bridging face 203 in the direction (parallel to one or more of the first face 2010 and the second face 202) of an opposite part of the bridging face 203 may be absorbed by the luminescent body 200.

In embodiments, the axicon may provide a continuous ring of first light. A discrete number of sub-beams may also be possible, with a facetted prismatic element (like the facets on a diamond). This would be desired for a k-gonal luminescent body.

In embodiments, a diameter D of the luminescent body may be at least 4 times an absorption length for the first device light 111.

Referring to FIG. 1 and FIG. 2*a*, in embodiments the first light generating device 110 and the one or more optical elements 400 may be configured to provide the first device light 111 via the slit-like opening 520 to the luminescent body 200. Further, to guide the first device light via the slit-like opening, it may be desirable that the device light is provided as a circular beam, substantially focusing to a ring located at about the bridging face (or perimeter). Focusing may be on the bridging face, or at a short distance upstream thereof, or a short distance from the bridging face into the luminescent body, such as within a value of +/−10% of D1 relative to the perimeter, like within +/−5% of D1 relative to the perimeter.

In embodiments, the luminescent body 200 may comprise light outcoupling structures 205 configured to couple part of the first device light 111 out via the second face 202. This is schematically depicted in FIG. 2*b*, embodiment I.

In embodiments, the light generating system 1000 further may comprise a dichroic layer 206 on at least part of the bridging face 203. This is also schematically depicted in FIG. 2*b*. In embodiments, a dichroic layer 206 may be configured to transmit first device light 111 and to reflect luminescent material light 211. Hence, FIG. 2*b* schematically depict a number of embodiments which are not necessarily combined.

Figure 2B:
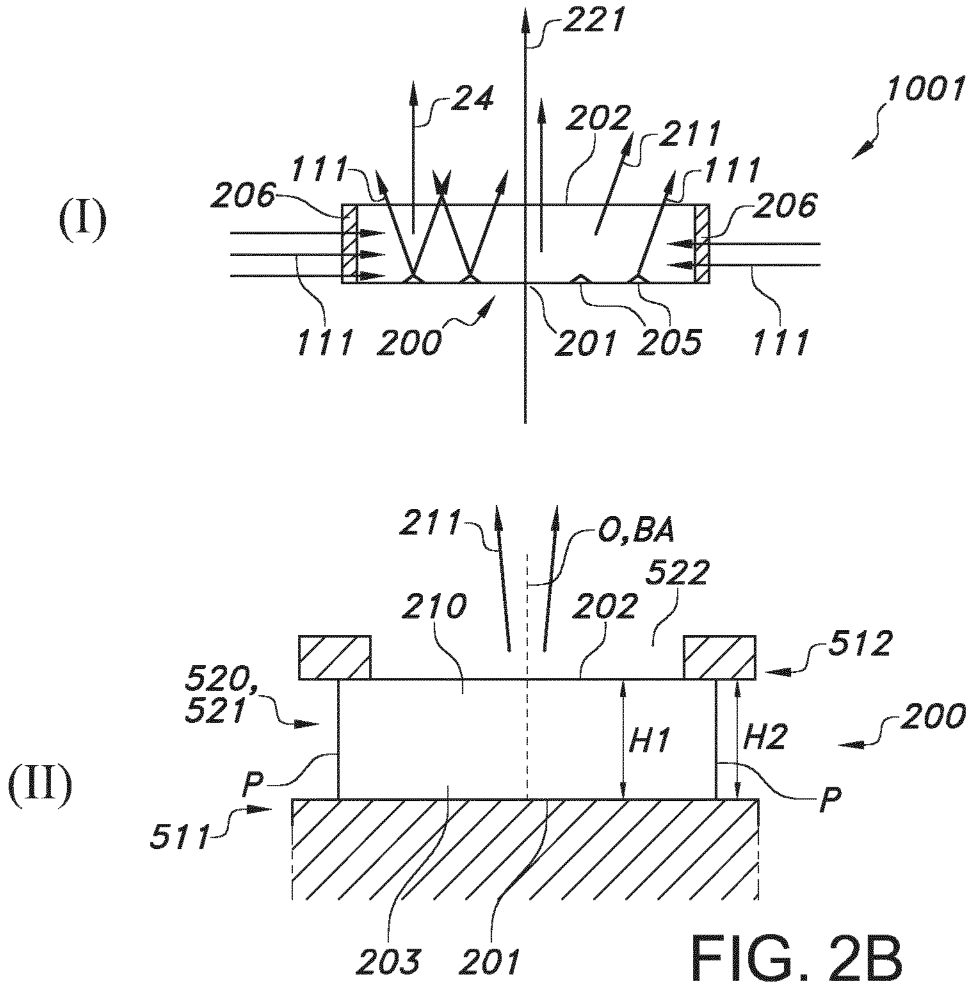

In embodiments, the light incoupling part 251 may be configured over the entire perimeter P, see also embodiment II of FIG. 2*b*.

In embodiments, the light incoupling part 251 has a second height H2, 0.1<H2/H<1.

In embodiments, the one or more thermally conductive bodies 510 comprise one or more heatsinks or the one or more thermally conductive bodies 510 are comprised by a heatsink.

In specific embodiments, the light generating system 1000 may further comprising a second light generating device 120. The second light generating device 120 may be configured to generate second device light 121 having a spectral power distribution different from one or more of (i) the first device light 111 and (ii) the luminescent material light 211. The first thermally conductive body part 511 may comprise a first thermally conductive body part opening 521. The second light generating device 120 may be configured to irradiate the first face 201 of the luminescent body 200 via the first thermally conductive body part opening 521.

An absorption of the second device light 121 through the luminescent body 200 perpendicular to the first face 201 (and/or the second face 202) may be selected such that at least 90% of the second device light 121 propagating from the first face 201 in the direction of second face 202 may be transmitted through the luminescent body 200.

In embodiments, the first height (H1) of the luminescent body may be less than 0.5 times an absorption length for the second device light 121.

In embodiments, the second light generating device 120 may be configured to generate second device light 121 having spectral intensity in one or more of the blue wavelength range and the red wavelength range.

The light generating system 1000 may be configured to generate system light 1001 comprising the luminescent material light 211 and the second device light 121.

The system light 1001 may be white light and has correlated color temperature selected from a range from 1800 K to 12000 K, and a color rendering index of at least 70.

Figure 3:
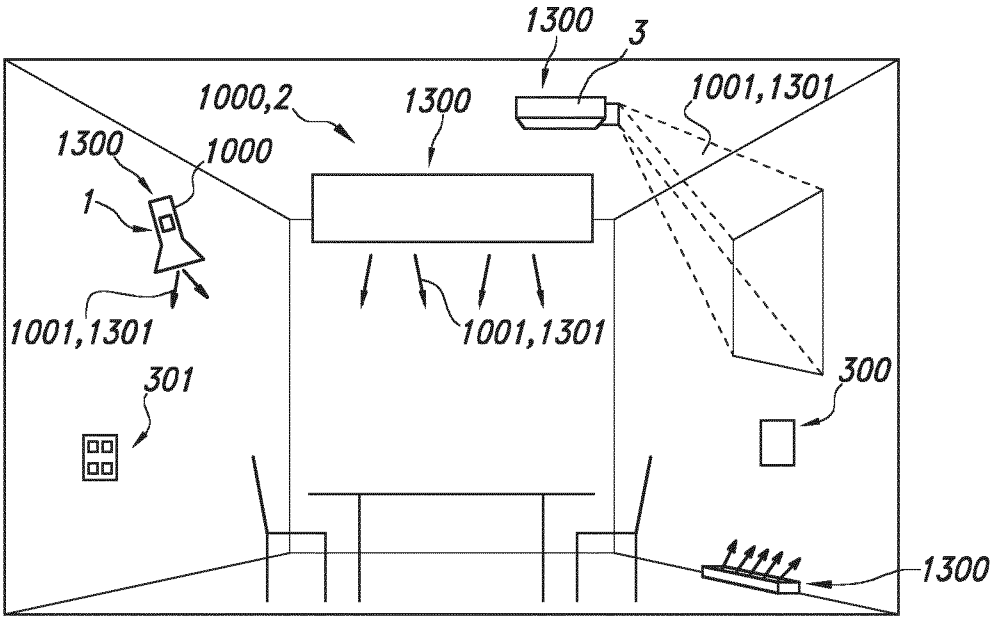
FIG. 3 schematically depict some applications.

FIG. 3 schematically depicts an embodiment of a luminaire 2 comprising the light generating system 1000 as described above. Reference 301 indicates a user interface which may be functionally coupled with the control system 300 comprised by or functionally coupled to the light generating system 1000. FIG. 3 also schematically depicts an embodiment of lamp 1 comprising the light generating system 1000. Reference 3 indicates a projector device or projector system, which may be used to project images, such as at a wall, which may also comprise the light generating system 1000. Hence, FIG. 3 schematically depicts embodiments of a lighting device 1300 selected from the group of a lamp 1, a luminaire 2, a projector device 3, a disinfection device, a photochemical reactor, and an optical wireless communication device, comprising the light generating system 1000 as described herein. In embodiments, such lighting device may be a lamp 1, a luminaire 2, a projector device 3, a disinfection device, or an optical wireless communication device. Lighting device light escaping from the lighting device 1300 is indicated with reference 1301. Lighting device light 1301 may essentially consist of system light 1001, and may in specific embodiments thus be system light 1001.

Amongst others, a light generating system is proposed for providing system light, the system comprising a (yellow) (ceramic) phosphor tile, a heatsink, an optical component and a (blue) laser providing (blue) laser light. In embodiments, a light in-coupling surface extends circumferentially around the ceramic phosphor tile as a closed-loop surface (about the main axis of extension).

The laser light may imping on the light in-coupling surface as a closed-loop by using the optical component.

Because the ceramic phosphor tile may be pumped circumferentially around the phosphor tile as a closed-loop, a hotspot of the (focused) laser light onto the ceramic phosphor plate may be reduced.

In embodiments, the cylindrical phosphor can be irradiated through a slit.

In embodiments, separate diode lasers with a fast axis and a slow axis may be applied. Further, collimators with different focus may be applied.

In an example, a diode laser with beam angles 14×46° is focused with a cylindrical lens in the vertical plane (fast axis, YZ) to a narrow focus. A half-cylindrical lens focusses the beam in the horizontal plane (slow axis, XY) to a wide focus. In this way the laser beam is imaged as a line onto the cylindrical surface of the phosphor. The phosphor can be cylindrical, hexagonal, square, etc. The optics used may be relatively simple (cylindrical) lenses.

Hence, in such embodiments a spot like light source may be converted into a line like light source.

Alternatively, e.g. a single diode laser may be applied, together with an axicon lens and a compound parabolic reflector.

An axicon lens may create a ring-shaped beam from a parallel blue laser beam.

A (truncated) compound parabolic reflector may focus the ring beam onto the (cylindrical) surface of the phosphor.

In embodiments, the ceramic phosphor tile may have preferably a cylindrical shape (or polygonal shape having k faces wherein k≥6).

In embodiments, the light in-coupling area (at maximum about $2 \cdot \pi \cdot r \cdot H1$) may preferably larger than the area of the bottom of the ceramic phosphor tile ($\pi \cdot r^2$). The phosphor concentration and diameter may be arranged such that the laser light is fully converted.

A closed-loop slit may be arranged in the heatsink which extends circumferentially around the ceramic phosphor tile as a closed-loop surface about the main axis of extension.

Alternatively, or in addition, the light in-coupling surface may be covered by a dichroic mirror to transmit the laser light while reflect (a large portion) of the converted light. The heatsink at the bottom of the ceramic phosphor tile may comprise a pinhole for injecting (via an optical component e.g. a lens) red laser light into the ceramic phosphor tile.

The light in-coupling surface may be arranged such that part of the blue laser light escapes via the top surface of the ceramic phosphor tile.

Alternatively, one or more of red and blue light may be added downstream of the ceramic phosphor tile.

With the invention, it may be possible to at least partly, or even substantially, prevent hot spot formation in a laser pumped phosphor. The phosphor disk (or phosphor tile) may be in good thermal contact with a reflective heatsink on the bottom and clamped from above by a heat sink with a hole from which the converted light is collected. Hence, the heat sink may have a narrow circumferential slit. A phosphor disk may be pumped through the narrow circumferential slit and through its cylindrical wall by two or more lasers.

In embodiments, the shape of each laser beam is elliptical (i.e. a short line, not a point) to pass through the slit and to spread out the pump energy.

When only one single laser is used, a hot spot may form at the point where the pump beam enters the luminescent body. When two lasers are used, the hot spot may (already) be more spread out. With yet more lasers, the hot spot may be spread out even more.

In embodiments, the slit in the heat sink can be all around the circumference of the luminescent body.

In embodiments, optics may be used to shape the laser beams into elliptically elongated spots. In embodiments, for the fast axis a cylinder lens may be used to narrow the wide vertical beam angle of the laser and focus it through the narrow slit. In embodiments, for the slow axis a half cylinder lens may be used to create a wide elongated focus on the bridging face of the luminescent body.

In second embodiments, a (parallel) laser beam may be sent through an axicon lens to create a ring shaped beam. In embodiments, a truncated compound parabolic reflector can then focus the ring shaped beam onto the cylindrical edge of the phosphor disk.

In embodiments, the phosphor disk may be clamped in a heatsink (see also above) and the converted light may be collected downstream of the second face.

In embodiments, the pump laser may be a single laser or a multitude of co-linear lasers.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" also includes embodiments wherein the term "comprises" means "consists of".

The term "and/of" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage. In yet a further aspect, the invention (thus) provides a software product, which, when running on a computer is capable of bringing about (one or more embodiments of) the method as described herein.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

Amongst others, the invention may provide a heatsink comprising a closed-loop slit for pumping a cylindrical (ceramic) phosphor tile in a closed-loop manner at the edge (thereof).

The invention claimed is:

1. A light generating system comprising a first light generating device, a luminescent body, one or more thermally conductive bodies, and one or more optical elements; wherein:

the first light generating device is configured to generate first device light, wherein the first light generating device comprises a first light source selected from the group of a superluminescent diode and a laser;

the luminescent body comprises a luminescent material configured to convert at least part of the first device light into luminescent material light; wherein the luminescent body comprises a first face, a second face, and a bridging face bridging the first face and the second face; wherein the second face has a second face equivalent circular diameter D2, wherein the bridging face has a first height H1, wherein $H1/D2<1$, and a perimeter;

the one or more thermally conductive bodies being reflective for the first device light and the luminescent material light and comprise:

a first thermally conductive body part, in thermal contact with at least part of the first face; and a second thermally conductive body part, in thermal contact with part of the bridging face and part of the second face;

the first thermally conductive body part and the second thermally conductive body part define a slit like opening along at least part of the perimeter of the bridging face;

the first light generating device and the one or more optical elements are configured to provide the first device light via the slit like opening to the luminescent body;

wherein the slit like opening defines a light incoupling part of the bridging face, configured to receive the first device light;

wherein, during operation of the light generating system, at least part of the luminescent material light escapes from at least part of said second face;

wherein the light incoupling part is configured along at least part of the perimeter; and wherein the light incoupling part has a light incoupling part area Al, wherein the second face has a second area A2, and wherein $1.1\leq A1/A2<8$ or wherein $0.05\leq A1/A2<0.75$.

2. The light generating system according to claim 1, wherein $1.5\leq A1/A2<8$ or wherein $0.25\leq A1/A2<0.75$.

3. The light generating system according to claim 2, wherein the bridging face has a third area A3, wherein $0.5\leq A1/A3\leq 1$.

4. The light generating system according to claim 1, wherein the slit like opening defines a light incoupling part of the bridging face, configured to receive the first device light; wherein the light incoupling part is configured over the entire perimeter.

5. The light generating system according to claim 1, wherein the one or more optical elements comprise one or more first optical elements, wherein the light generating system comprises n sets of a first light generating device and the one or more first optical elements, wherein the first light generating device and the one or more first optical elements are configured to provide the first device light via the slit like opening to the luminescent body, wherein n≥1.

6. The light generating system according to claim 5, wherein the one or more first optical elements comprise a first cylindrical lens, configured downstream of the first light generating device, and a first half-cylindrical lens configured downstream of the first cylindrical lens.

7. The light generating system according to claim 5, wherein n≥2, and wherein mutual angles $\alpha_{sm}$ between optical axes Os of the sets comply with $\alpha_{sm}\neq 360°/n$ when n is even.

8. The light generating system according to claim 1, wherein the one or more optical elements comprise one or more second optical elements, wherein the one or more second optical elements comprise a first axicon lens, configured downstream of the first light generating device, and a second cylindrical reflector, configured downstream of the first axicon lens, wherein the first light generating device and the one or more second optical elements are configured to focus a ring-shaped beam of first device light via the slit-like opening on the luminescent body.

9. The light generating system according to claim 8, wherein the second cylindrical reflector-comprises a truncated compound parabolic reflector.

10. The light generating system according to claim 1, wherein an absorption of the first device light through the luminescent body parallel to the first face is selected such that at least 90% of the first device light propagating from one part of the bridging face in the direction of an opposite part of the bridging face is absorbed by the luminescent body.

11. The light generating system according to claim 1, wherein the luminescent body has a cross-sectional shape selected from k-gonal, wherein k≥4, and cylindrical; and wherein luminescent body comprises a ceramic body or a single crystal.

12. The light generating system according to claim 1, wherein the luminescent material comprises a luminescent material of the type $A_3B_5O_{12}$:Ce, wherein A comprises one or more of Y, La, Gd, Tb and Lu, and wherein B comprises one or more of Al, Ga, In and Sc; and wherein the one or more thermally conductive bodies comprise one or more heatsinks or wherein the one or more thermally conductive bodies are comprised by a heatsink.

13. The light generating system according to claim 1, further comprising a second light generating device, wherein the second light generating device is configured to generate second device light have a spectral power distribution different from one or more of the first device light and the luminescent material light; wherein the first thermally conductive body part comprises a first thermally conductive body part opening, wherein the second light generating device is configured to irradiate the first face of the luminescent body via the first thermally conductive body part opening, wherein an absorption of the second device light through the luminescent body perpendicular to the first face is selected such that at least 90% of the second device light propagating from the first face in the direction of second face is transmitted through the luminescent body.

14. The light generating system according to claim 13, wherein the second light generating device is configured to generate second device light having spectral intensity in one or more of the blue wavelength range and the red wavelength range; wherein the light generating system is configured to generate system light comprising the luminescent material light and the second device light, wherein the system light is white light and has correlated color temperature selected from a range from 1800 K to 12000 K, and a color rendering index of at least 70.

15. A lighting device selected from the group of a lamp, a luminaire, a projector device, a disinfection device, a photochemical reactor, and an optical wireless communication device, comprising the light generating system according to claim 1.

* * * * *